Feb. 23, 1926.  1,574,627
J. W. HAINES
ATTACHMENT FOR PLOWS
Filed August 25, 1922   2 Sheets-Sheet 2
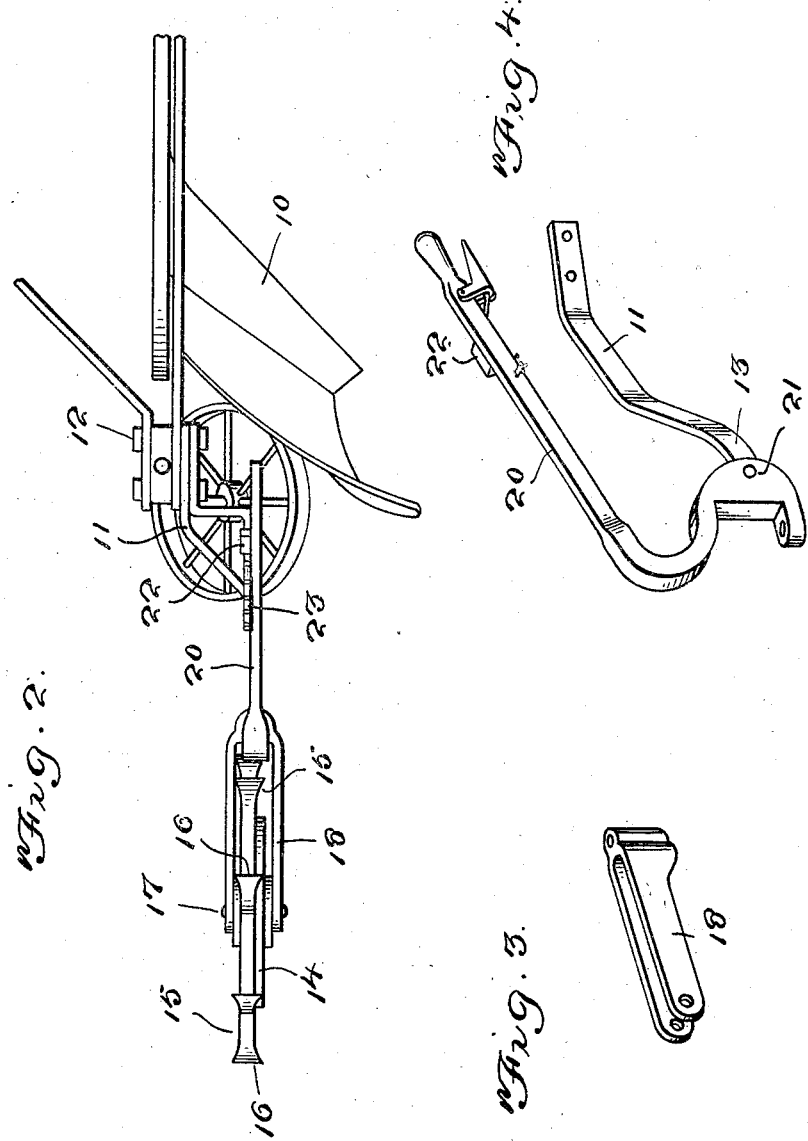

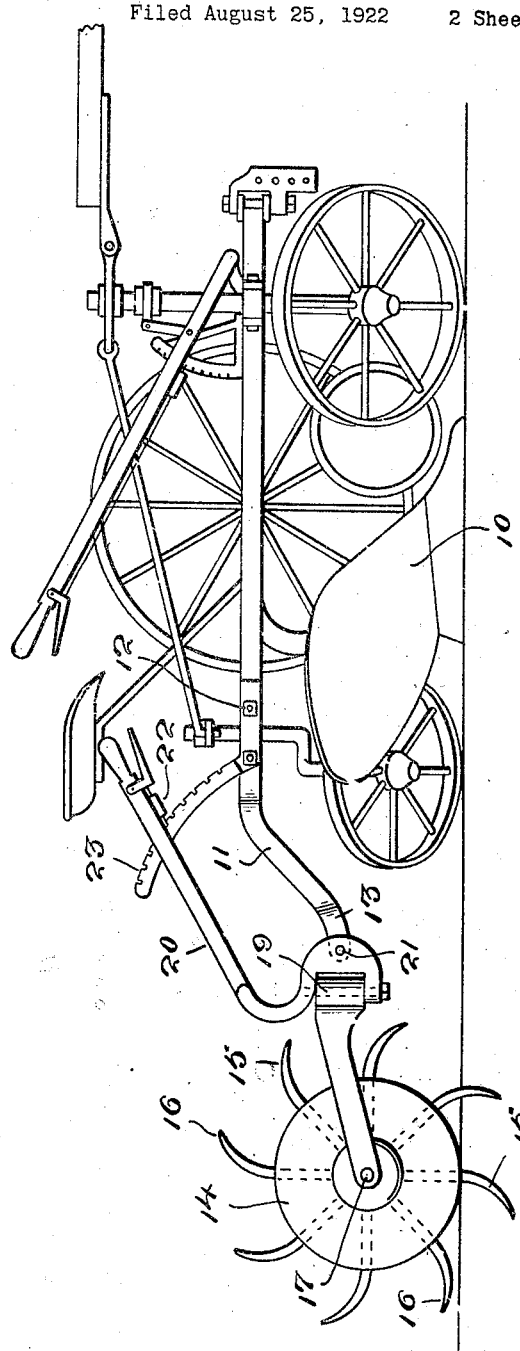

Patented Feb. 23, 1926.

1,574,627

UNITED STATES PATENT OFFICE.

JOHN W. HAINES, OF CHANUTE, KANSAS.

ATTACHMENT FOR PLOWS.

Application filed August 25, 1922. Serial No. 584,312.

*To all whom it may concern:*

Be it known that I, JOHN W. HAINES, a citizen of the United States, residing at Chanute, in the county of Neosho and State of Kansas, have invented new and useful Improvements in Attachment for Plows, of which the following is a specification.

This invention relates to improvements in agricultural machines and has for an object the provision of a subsoiler, which may be attached to a plow or other device, whereby plowing and subsoiling may be simultaneously accomplished.

Another object of the invention is the provision of a subsoiler attachment which will penetrate the ground with the least possible resistance and which will effectually loosen the ground at the bottom of a plowed furrow, so that the latter will properly absorb and distribute moisture.

Another object of the invention is the provision of a subsoiler which will properly follow a furrow and whose penetrating depth may be conveniently regulated.

With the above and other objects in view, the invention further includes the following novel features and details of construction, to be hereinafter more fully described, illustrated in the accompanying drawings and pointed out in the appended claim.

In the drawings:—

Figure 1 is a side elevation of a plow with the subsoiler attachment applied thereto.

Figure 2 is a plan view of the same.

Figure 3 is a detail perspective view of the bearing member of the attachment.

Figure 4 is a similar view of the adjusting lever.

Referring in detail to the drawings, wherein like characters of reference denote corresponding parts, the reference character 10 indicates a plow which may be of any suitable type. It may be here stated that while the invention is shown attached to a plow, it may be attached to other agricultural machines or implements of any character which are used to break land preparatory to the planting of crops, or it may be used for loosening hard ground or for road work.

For the purpose of attaching the invention to the plow 10, there is provided a beam 11, which is secured by suitable fastening devices 12 and whose rear end is curved downwardly and outwardly as at 13. The beam is shown as extending rearwardly of the plow so that the device which constitutes the present invention will act as a trailer, but if desired the device may be positioned at the forward end of the plow.

The said device or subsoiler attachment comprises a wheel or disk 14, from which extends radially disposed arms 15 whose outer ends are curved and terminate in substantially shovel-shaped penetrating elements 16, which dig into the soil at the bottom of a furrow and as the disk or wheel 14 rotates, these shovel-shaped penetrating points act to thoroughly loosen and break up the ground as they are withdrawn.

The disk or wheel 14 is mounted upon an axle 17 which is carried at the end of a bearing member 18. This bearing member comprises substantially parallel arms whose inner ends are pivoted upon a pivot pin 19 so that the bearing member 18 may have a horizontal pivotal movement which will permit the disk or wheel 14 to accurately follow the furrow. The bearing member 18 is provided at one end of an adjusting lever 20 and the said lever is in turn pivoted as shown at 21 to the end 13 of the beam 11, so that vertical pivotal movement of the bearing member may be effected to regulate the cutting or penetrating depth of the penetrating points 16. The lever 20 is adjustably held in position by means of a spring actuated latch 22 which engages a rack bar 23. The periphery of the wheel or disk 14 is provided with a cutting edge to prevent the collection of trash.

The invention is susceptible of various changes in its form, proportions and minor details of construction and the right is herein reserved to make such changes as properly fall within the scope of the appended claim.

Having described the invention what is claimed is:—

The combination with an agricultural machine, of a rearwardly and downwardly disposed arm rigidly secured to the machine, an adjusting lever mounted upon the outer end of said arm for vertical pivotal movement, vertically spaced bearing arms included in said lever, a fork mounted for horizontal pivotal movement between said bearing arms, a rotary member mounted in said fork, a plurality of penetrating elements extending from the rotary member, an upwardly and rearwardly curved toothed arm extending from the rigid arm in the path of the lever and means carried by the arm to engage the tooth of the lever and hold the latter in adjusted position.

In testimony whereof I affix my signature.

JOHN W. HAINES.